Patented Apr. 3, 1923.

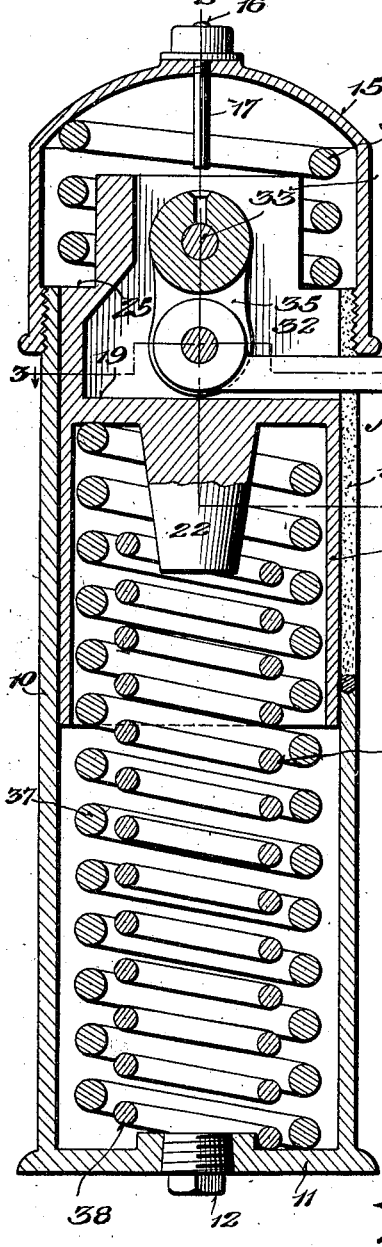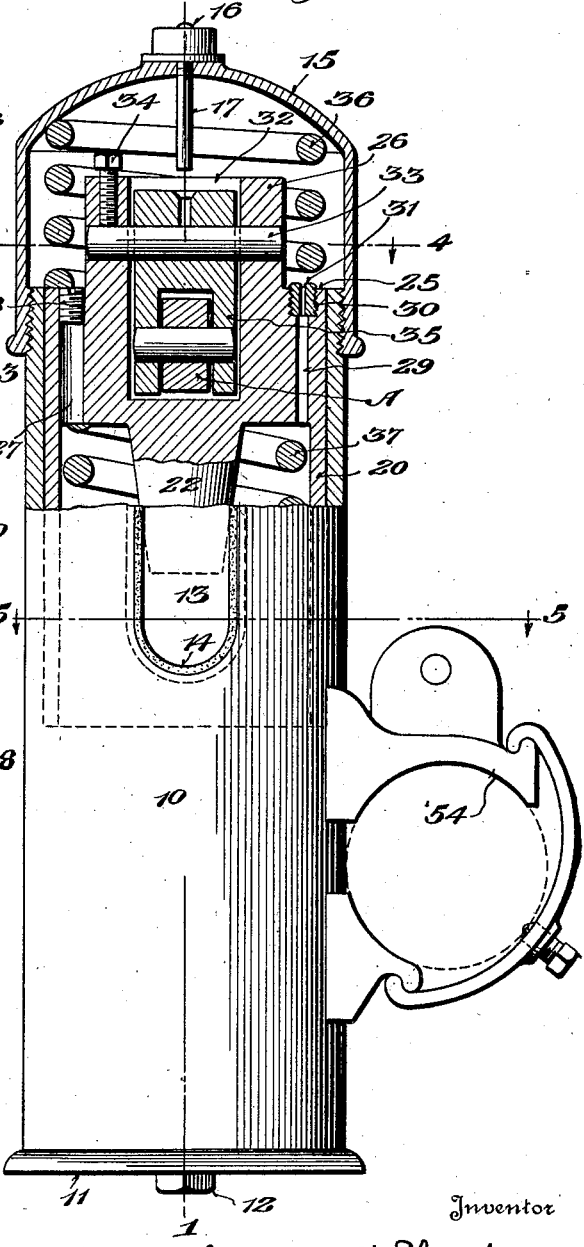

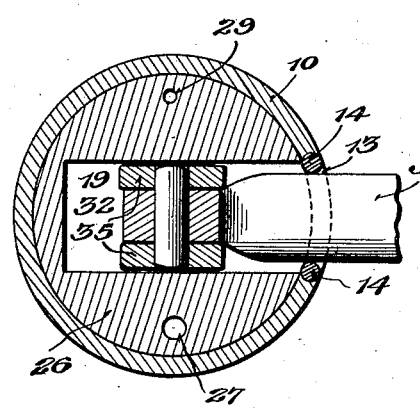
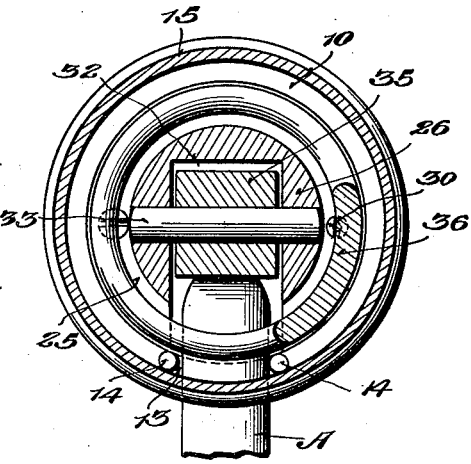
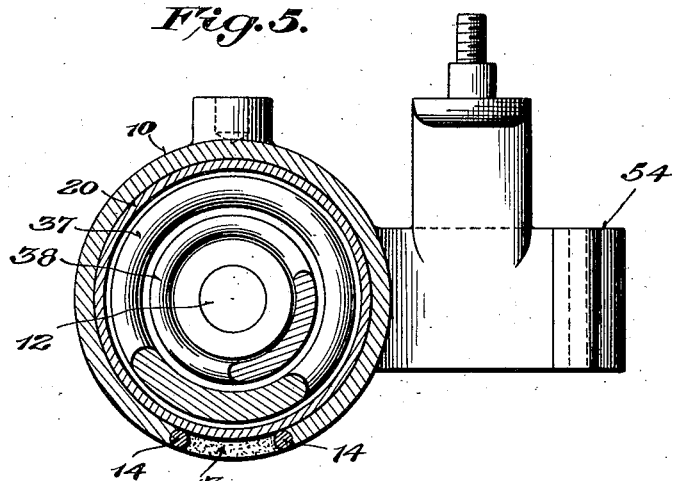
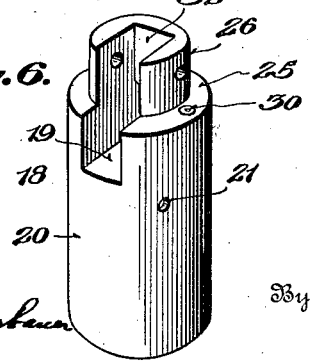

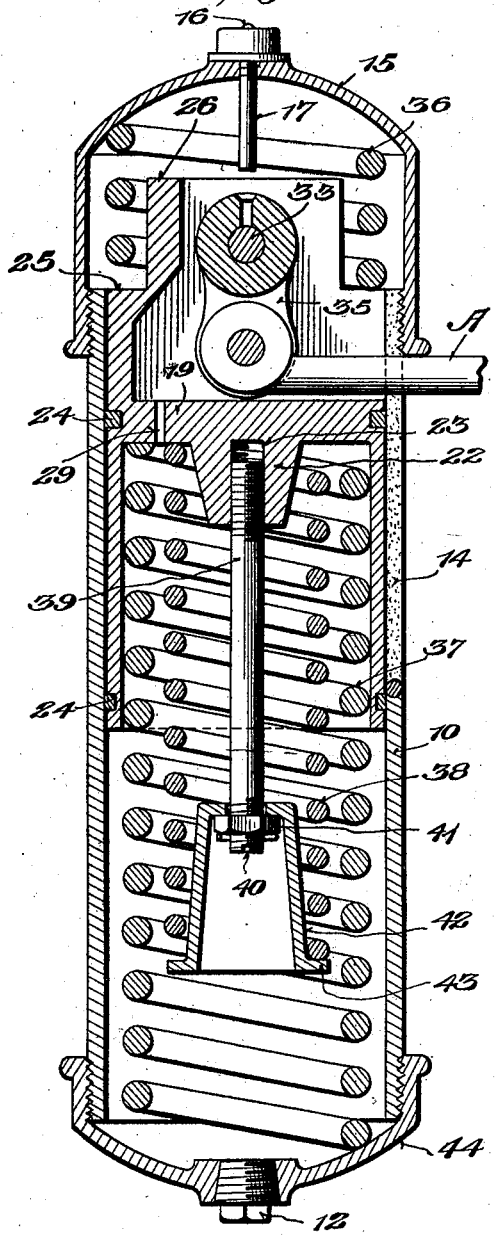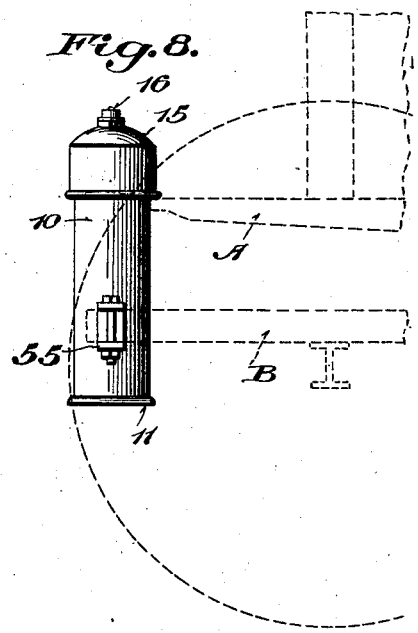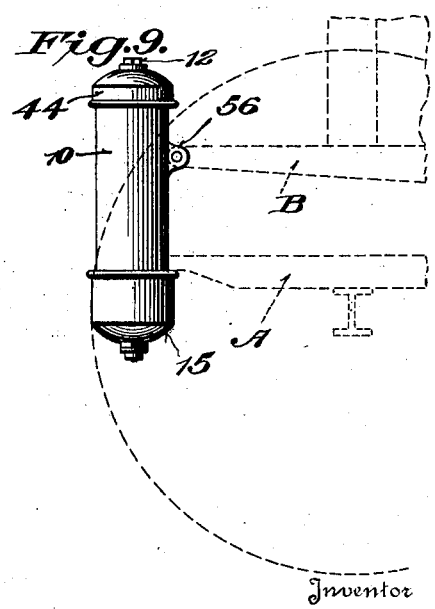

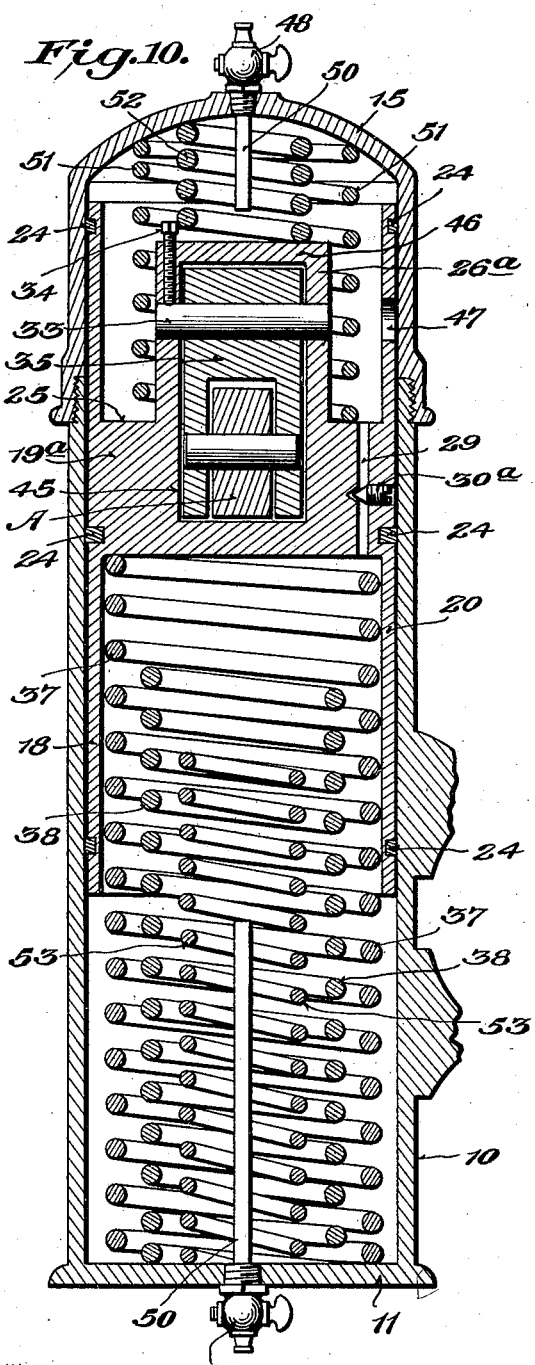

1,450,654

UNITED STATES PATENT OFFICE.

CLARANCE W. THOMPSON, OF WILMINGTON, DELAWARE, ASSIGNOR TO THOMPSON SPRING COMPANY, OF WILMINGTON, DELAWARE, A CORPORATION OF DELAWARE.

VEHICLE SPRING.

Application filed July 9, 1921. Serial No. 483,621.

*To all whom it may concern:*

Be it known that I, CLARANCE W. THOMPSON, a citizen of the United States, residing at Wilmington, in the county of New Castle and State of Delaware, have invented certain new and useful Improvements in Vehicle Springs, of which the following is a specification.

The invention relates to vehicle-spring devices of the counteracting type formed and arranged to be associated with an axle or other load-sustaining member of a running-gear and with a member of the body or equivalent load-carrying part, so that the relative vertical movements caused by shocks, thrusts, and stresses resulting from irregularities in the roadway over which the vehicle travels may be absorbed.

It is an object of the invention so to form and arrange the parts of such a device that they may be easily and economically produced and assembled and so that the assembled device may be installed readily in and with equal facility be removed from a vehicle.

Another object of the invention is so to form and arrange the parts and to embody therein springs so relatively tensioned that the device will be properly sensitive under normal loads to irregularities of reasonably smooth roadways and be increasingly resistive under overloads and also to comparatively rough roadways both under normal and over normal loads.

When considered in connection with the description herein, the characteristics of the invention will be apparent from the accompanying drawings, forming part hereof, wherein embodiments of the invention adapted for use on roadway-traversing motor-vehicles are disclosed, for purposes of illustration.

While the disclosures herein exemplify what now are considered to be preferable embodiments of the invention, it is to be understood that it is not the intention to be limited necessarily thereto in interpretation of the claims, as modifications within the limits of the claims can be made and the device adapted to other types of vehicles without departing from the nature of the invention.

Like reference-characters refer to corresponding parts in the views of the drawings, of which—

Fig. 1 is a section on the line 1—1, Fig. 2;
Fig. 2 is an elevation, partly in section on the line 2—2, Fig. 1;
Fig. 3 is a section on the line 3—3, Fig. 1;
Fig. 4 is a section on the line 4—4, Fig. 2;
Fig. 5 is a section on the line 5—5, Fig. 2;
Fig. 6 is a view of the piston;
Fig. 7 is a longitudinal section of a modification;
Fig. 8 illustrates installation of the device;
Fig. 9 illustrates another installation;
Fig. 10 is a longitudinal section of a modification; and
Fig. 11 is a view of an alternative form of piston.

For convenience, the parts are referred to as in the relative positions they have when the device is installed as shown by Fig. 8.

The parts of the device are contained in an elongated cylindrical casing 10, which as seen in Figs. 1, 2, 8, and 10 is closed at its lower end by an integral end wall 11 having a drain-plug 12 therein. The casing has a longitudinal slot or opening 13 in its side wall, which extends from about midway of its length to the upper end. The edges of the slot are grooved and hold packing 14. The upper end of the casing is exteriorly threaded, and it is closed by a dome or bell shaped cap 15 screwed thereon. The cap has a lubricant-inlet 16 in its head, from which leads a duct 17.

A hollow cylindrical piston or stress-sustaining member 18 is slidable longitudinally in, and has a fairly close fit with, the wall of the casing, by which it is guided. It has a head or partition 19 near its upper end, which separates the upper and lower portions of the interior, the latter portion of which is surrounded by a main body portion or wall 20. That wall is formed with lubricant-passages 21. A centrally-positioned guide and reinforcing member 22 depends from the head or partition, and it has a threaded opening or seat 23.

If desired, the piston may be equipped with packing-rings 24, as seen in Figs. 7 and 10, to afford a substantially air-tight fit between the abutting walls of the piston and casing, whereby air may be employed as a resistant to movement of the piston. However, even when there is sufficient clearance between the piston and casing walls to permit passage of air therebetween, the device will function properly with spring resistance, as hereinafter described.

The piston-wall above the head or partition has an annular abutment or seat 25, above which extends a reduced or contracted integral terminal portion 26. A lubricant-passage 27, normally closed by a plug 28, extends from the abutment through the head or partition into the interior of the piston. In another place, an air-passage 29 similarly is disposed. If desired, the air-passage may be closed at its upper end by a plug 30, having a vent 31.

A longitudinal centrally-positioned slot or opening 32 extends from the head or partition 19 to the upper end of the extension 26. A pin or shaft 33 is disposed at right angles to and across the slot, it is carried by the wall of the extension, and it is held therein by a lock-screw 34. A shackle member 35 is swingably mounted on and depends from the pin or shaft.

The parts hereinbefore described, as shown by Figs. 1 to 7, inclusive, are arranged to have rebound and load-sustaining springs associated therewith.

A rebound compression-resisting coil-spring 36 is interposed between the abutment or seat 25 and the head of the cap 15.

A comparatively large main load-sustaining compression-resisting coil-spring 37 is interposed between the end wall 11 of the casing and the head or partition 19.

As seen in Fig. 1, an auxiliary compression-resisting coil-spring 38 is located inside of, and is shorter than, the spring 37 when the latter is under normal compression. The member 22 of the piston-head extends into and constitutes a guide for the adjacent end portion of the spring 38. That spring, when under compression, seats against the head and the end wall 11.

Another arrangement of auxiliary spring is disclosed by Fig. 7. In that form, a rod-like member 39 has a threaded end portion that is screwed into the threaded seat 23, it has at its free end a notch 40 to receive a screw-driver, and it also has on its free end portion a nut 41. The nut holds on the member a slidable sleeve 42, which is of cylindrical or truncated-cone shape, and which has the member 39 extending through its head. The sleeve normally extends beyond the end of member 39, and it has at its free end an annular flange or seat 43 between which and the head 19 the auxiliary spring is disposed. The parts are proportioned and coordinated in such manner that under normal conditions of service the sleeve is an appreciable distance from the end wall of the casing. The tension of the auxiliary spring may be adjusted by turning the member 19, nut 41, or both of them.

If desired, the casing, instead of being closed at one end by an integral end wall such as shown at 11, may be closed by a cap 44 screwed thereon, as seen in Figs. 7 and 9. It is of advantage to use a casing of that form when that end is uppermost, as seen in Fig. 9, in order to afford convenient access to the parts. The closing-cap is particularly desirable on that end when the spring arrangement of Fig. 7 is employed, in order that convenient access may be had to the member 39 and nut 41 for adjustment of tension of the auxiliary spring.

The casing is charged with lubricant through the passage 27, and also by removal of cap 44.

The invention also provides another form of piston member in the casing for imposing stresses on springs and against resistance of air, as exemplified by Figs. 10 and 11, and another arrangement of springs is disclosed by Fig. 10.

The piston or stress-imposing member of that form is arranged particularly with a view of utilizing air, in addition to springs, as a resistant both to its movement in one direction in response to thrusts, stresses, and the like, and to its rebound movement in the other direction.

With this in view, the cylindrical wall 20 of the member extends on each side of an intermediate partition $19^a$, it closely contacts with the wall of the casing, and it is equipped with packing-rings 24 as in the case of the member shown by Fig. 7.

The partition $19^a$ is thicker than that of the other forms, and it has a transverse passage or chamber 45 that extends from the periphery of the member to position below and communicating with a chamber contained in a cylindrical extension $26^a$. That extension is formed integrally with, and is of less diameter than, the remainder of the member. It is formed with a head 46, and it is airtight, except for the entrance afforded by the chamber 45, which is below the upper side of the partition $19^a$. Like the extension shown by other views of the drawings, the extension $26^a$ contains the shackle member 35, an opening 47 being provided in the piston-wall to permit the pin or shaft 33 to be placed in or removed from position.

If it is desired to employ air pressure in the casing above atmospheric, air may be forced thereinto through one or both of pet-cocks 48 and 49, and thereafter pressure may be reduced toward atmospheric by permitting air to escape from one or both of the pet-cocks. A tube 50 extends from each pet-cock, so that the one that is lowermost may extend above the level of lubricant in the casing and thus prevent discharge thereof when permitting escape of air.

As seen in Fig. 10, a rebound compression-resisting coil-spring 51 is interposed between the abutment or seat 25 and the head of the cap 15. That spring is tensioned to expand and maintain its ends against the seat and cap during movement of the seat away from the cap to or nearly to its limit of such movement and to commence resistance to movement in the opposite direction practically as soon as such movement starts.

A rebound compression-resisting coil-spring 52 is disposed inside of spring 51 and between the head of the cap and the head of the extension 26$^a$. The spring 52 is arranged to expand on initial movement of the piston away from the cap 15, and then to follow the head of the extension 26$^a$ if the cap is uppermost or to remain on the cap if the latter is installed in lowermost position. In either case, if rebound movement of the piston is not stopped by the spring 51 and by air resistance, the spring 52 will cushion remaining rebound effort and stop movement of the piston.

As shown by Figs. 1 and 7, the arrangement disclosed by Fig. 10 includes the comparatively large main load-sustaining compression-resisting coil-spring 37 interposed between the end wall of the casing and the piston-partition. The auxiliary compression-resisting coil-spring 38, which is shorter than the spring 37 when he latter is under normal compression, also is located inside of that spring in the arrangement shown by Fig. 10.

In addition, in the arrangement of Fig. 10, a second auxiliary compression-resisting coil-spring 53 is located inside of spring 38, and it is shorter than that spring.

When the device is installed in a vehicle, the casing may be mounted on the round portion of an axle or similar part by members 54, as seen in Fig. 2; on an axle-carried part by a member 55, as seen in Fig. 8; or on a body part by a member 56, as seen in Fig. 9.

With installation in any of the several dispositions of which the device is susceptible, vehicle members A and B, between which there are stresses and thrusts and relative effort, or one of which sustains weight imposed by the other, as between an axle-borne member and a body part, are connected, respectively, to the shackle member 35 and to the casing. The member A extends into the piston, and it is capable of relative movement with respect to the casing in the slot 13 thereof.

Under normal load and during running the vehicle under conditions to impart only normal movement of the piston in the casing from the end containing the rebound-spring 36, the main spring 37 of itself or in cooperation with air in the casing is capable of restraining that movement of the piston.

When shocks, thrusts, stresses, or efforts are more severe as a result of overload, irregularities in the roadway, speed, or all of them, and the piston is moved sufficiently to bring the auxiliary spring 38 under compression, that spring will resist further movement of the piston; and, in the case of the arrangement shown by Fig. 10, if the movement continues, the second auxiliary spring 53 thereafter resists that movement.

When a device with a spring arrangement like that of Fig. 1 or Fig. 10 is installed with the shackle end uppermost, as seen in Fig. 8, the auxiliary spring or springs rest on the bottom wall of the casing and they normally are out of contact with the piston-partition; and, if the device is installed in the reverse position, as seen in Fig. 9, the auxiliary spring or springs rest on the piston-partition and are out of contact with the end wall.

With the spring arrangement of Fig. 7, the auxiliary spring is held between the piston-partition and sleeve 42. When the piston has been moved sufficiently to bring the sleeve against the end wall of the casing, the member 39 slides in the sleeve and the auxiliary spring is compressed.

The main and auxiliary springs are formed in such manner that their coils will come together and stop movement of the piston under excessive loads or efforts before the free end of the member 39 or the lower end of the piston-wall comes into contact with the end wall of the casing, so that injury that might result from such contact is prevented.

Rebound movement of the piston is cushioned by the spring 36 in the arrangements disclosed by Figs. 1, 2, and 7, and in the arrangement disclosed by Fig. 10 the rebound is absorbed first by spring 51 and then by spring 52, as hereinbefore explained.

Air also resists movement of the piston in both directions, the amount of resistance being controlled or altered by the size of the vent in plug 30, as one such plug may be removed and replaced with one of a different size, or by turning the valve 30$^a$ of Fig. 10.

Having thus described my invention, what I claim as new, and desire to secure by Letters Patent, is—

1. A spring device comprising an elongated casing arranged to be connected with a vehicle part and having an end wall and a longitudinal slot in its side wall, a hollow piston therein having a partition, a main compression-resisting coil-spring interposed between said partition and end wall, a rod on said partition extending into said main spring, a sleeve slidable on said rod normally out of contact with and arranged to contact with said end wall after initial compression of said main spring and having an annular seat, a member maintaining said sleeve on said rod, an auxiliary spring interposed between said partition and annular seat, and a member mounted on said piston arranged to be connected with a vehicle part movable in said slot.

2. A spring device comprising an elongated casing arranged to be connected with a vehicle part and having an end wall and a longitudinal slot in its side wall, a hollow piston therein having a partition formed with a central threaded seat, a main compression-resisting coil-spring interposed between said partition and end wall, a rod having a threaded end portion turnable in said threaded seat, a sleeve on said rod slidable with respect thereto normally out of contact with and arranged to contact with said end wall after initial compression of said main spring and having an annular seat, a member adjustable on said rod maintaining said sleeve thereon, an auxiliary spring interposed between said partition and annular seat, and a member mounted in said piston arranged to be connected with a vehicle part movable in said slot.

3. A spring device comprising a casing arranged to be connected with a vehicle part and having an end wall and a longitudinal slot in its side wall, a hollow piston therein having a partition formed with a threaded seat, an extension at the other side of the partition, there being an annular seat around said extension and said piston having a lateral opening, a member swingably mounted in said extension arranged to be connected with a vehicle part extending through said opening and movable in said slot, a spring arranged to resist movement of said piston in one direction seatable against said annular seat, a main compression-resisting coil-spring interposed between said partition and said end wall, a rod having a threaded end portion turnable in said threaded seat, a sleeve on said rod slidable with respect thereto normally out of contact with and arranged to contact with said end wall after initial compression of said main spring and having an annular seat, a member adjustable on said rod maintaining said sleeve thereon, and an auxiliary spring interposed between said partition and sleeve-seat.

In witness whereof, I affix my signature.

CLARANCE W. THOMPSON.